(12) United States Patent
Kadlicko (10) Patent No.: US 7,856,817 B2
(45) Date of Patent: Dec. 28, 2010

(54) HYDRAULIC DRIVE SYSTEM

(75) Inventor: George Kadlicko, Rockford, IL (US)

(73) Assignee: Haldex Hydraulics Corporation, Rockford, IL (US)

( * ) Notice: Subject to any disclaimer, the term of this patent is extended or adjusted under 35 U.S.C. 154(b) by 67 days.

(21) Appl. No.: 12/422,402

(22) Filed: Apr. 13, 2009

(65) Prior Publication Data

US 2009/0193801 A1   Aug. 6, 2009

Related U.S. Application Data

(63) Continuation of application No. 11/291,753, filed on Dec. 1, 2005, now Pat. No. 7,516,613.

(60) Provisional application No. 60/632,176, filed on Dec. 1, 2004, provisional application No. 60/632,178, filed on Dec. 1, 2004, provisional application No. 60/677,103, filed on May 3, 2005.

(51) Int. Cl.
*F15B 11/00* (2006.01)
*E02F 9/22* (2006.01)

(52) U.S. Cl. .................... 60/414; 60/428; 60/464

(58) Field of Classification Search ............ 60/375, 60/402, 414, 419, 428, 430, 464, 465, 484, 60/486
See application file for complete search history.

(56) References Cited

U.S. PATENT DOCUMENTS

| | | |
|---|---|---|
| 3,446,019 A | 5/1969 | Bullough |
| 3,791,703 A | 2/1974 | Ifield |
| 3,889,759 A | 6/1975 | Larson |
| 3,900,075 A | 8/1975 | Chichester et al. |
| 3,922,854 A | 12/1975 | Coeurderoy |
| 3,963,039 A | 6/1976 | Coeurderoy |
| 3,990,235 A | 11/1976 | Bauchet |
| 4,105,086 A | 8/1978 | Ishii et al. |
| 4,129,063 A | 12/1978 | Ifield |
| 4,157,125 A | 6/1979 | Bushell et al. |
| 4,342,164 A | 8/1982 | Claassen |
| 4,354,420 A | 10/1982 | Bianchetta |
| 4,498,554 A | 2/1985 | Young et al. |
| 4,500,818 A | 2/1985 | Konrad et al. |
| 4,540,221 A | 9/1985 | Frazer |
| 4,540,345 A | 9/1985 | Frazer |
| 4,549,610 A | 10/1985 | van der Lely |
| 4,570,741 A | 2/1986 | McCoy |
| 4,776,418 A | 10/1988 | Winckler et al. |
| 4,779,693 A | 10/1988 | Takahashi et al. |

(Continued)

FOREIGN PATENT DOCUMENTS

DE   102005027940 A1   1/2006

(Continued)

*Primary Examiner*—Thomas E Lazo
(74) *Attorney, Agent, or Firm*—St. Onge Steward Johnston & Reens LLC (57) ABSTRACT

A hydraulic drive system for an actuator uses a pair of pressure compensated hydraulic machines to control flow to and from the drive chambers of the actuator by varying the controlled pressure of one of the machines. The machines are mechanically coupled to permit energy recovery and charge an accumulator to store supplies energy. The drive system may be combined with other services including a transmission for incorporation in a vehicle. The transmission uses a pressure compensated supply and torque control of the wheels.

16 Claims, 8 Drawing Sheets

U.S. PATENT DOCUMENTS

| | | | |
|---|---|---|---|
| 4,811,562 | A | 3/1989 | Hoffmann et al. |
| 4,811,805 | A | 3/1989 | Yoshida et al. |
| 4,860,845 | A | 8/1989 | Janson |
| 4,880,073 | A | 11/1989 | Konno |
| 4,886,142 | A | 12/1989 | Yamaoka et al. |
| 4,909,342 | A | 3/1990 | Janson et al. |
| 4,949,803 | A | 8/1990 | Janson et al. |
| 4,966,246 | A | 10/1990 | Janson et al. |
| 4,967,543 | A | 11/1990 | Scag et al. |
| 5,076,377 | A | 12/1991 | Frazer |
| 5,126,942 | A | 6/1992 | Matsuda |
| 5,195,603 | A | 3/1993 | Sugiyama |
| 5,201,570 | A * | 4/1993 | Heren et al. .................. 303/10 |
| 5,258,912 | A | 11/1993 | Ghoneim et al. |
| 5,335,750 | A | 8/1994 | Geringer et al. |
| 5,429,428 | A | 7/1995 | Yasuda |
| 5,474,147 | A | 12/1995 | Yesel et al. |
| 5,533,325 | A | 7/1996 | Sallstrom et al. |
| 5,564,518 | A | 10/1996 | Ishii et al. |
| 5,607,027 | A | 3/1997 | Puett, Jr. |
| 5,715,664 | A | 2/1998 | Sallstrom et al. |
| 5,809,846 | A | 9/1998 | Ohkura et al. |
| 5,848,664 | A | 12/1998 | Kaspar |
| 5,899,292 | A | 5/1999 | Paul et al. |
| 5,915,496 | A | 6/1999 | Bednar et al. |
| 5,934,881 | A | 8/1999 | Yumoto |
| 5,950,758 | A | 9/1999 | Kim et al. |
| 6,069,460 | A | 5/2000 | Grabowski et al. |
| 6,098,738 | A | 8/2000 | White |
| 6,109,384 | A | 8/2000 | Bromley et al. |
| 6,119,061 | A | 9/2000 | Schenkel et al. |
| 6,739,127 | B2 * | 5/2004 | Nippert et al. ................ 60/414 |
| 2001/0047654 | A1 | 12/2001 | Rush et al. |
| 2002/0179340 | A1 | 12/2002 | Jolliff et al. |
| 2002/0189250 | A1 | 12/2002 | Bruun |
| 2003/0097837 | A1 | 5/2003 | Hiraki et al. |
| 2004/0173396 | A1 | 9/2004 | Rush et al. |
| 2004/0251067 | A1 | 12/2004 | Gray, Jr. et al. |
| 2005/0161167 | A1 | 7/2005 | Russel-Smith |
| 2005/0161268 | A1 | 7/2005 | Yang |
| 2005/0167177 | A1 | 8/2005 | Roethler et al. |
| 2005/0194054 | A1 | 9/2005 | Moskalik et al. |
| 2005/0207921 | A1 | 9/2005 | Gray, Jr. |
| 2005/0241437 | A1 | 11/2005 | Gray, Jr. et al. |
| 2006/0000208 | A1 | 1/2006 | Teslak et al. |
| 2006/0000659 | A1 | 1/2006 | Teslak et al. |
| 2006/0001314 | A1 | 1/2006 | Teslak et al. |
| 2006/0004507 | A1 | 1/2006 | Teslak et al. |
| 2006/0021813 | A1 | 2/2006 | Gray, Jr. |
| 2008/0104953 | A1 | 5/2008 | Vigholm |
| 2008/0260900 | A1 | 10/2008 | Wittorff et al. |

FOREIGN PATENT DOCUMENTS

| | | |
|---|---|---|
| EP | 0245308 B1 | 8/1991 |
| EP | 0893698 A1 | 1/1999 |
| EP | 0762957 B1 | 3/2001 |
| EP | 0854793 B1 | 4/2002 |
| EP | 1199204 A1 | 4/2002 |
| EP | 1223066 A2 | 7/2002 |
| EP | 1228917 A1 | 8/2002 |
| EP | 1342937 A2 | 3/2003 |
| EP | 1600372 A2 | 11/2005 |
| EP | 628028 A2 | 2/2006 |
| GB | 2386164 A | 9/2003 |
| WO | 8702952 A1 | 5/1987 |
| WO | 8705574 A1 | 9/1987 |
| WO | 0013952 A1 | 3/2000 |
| WO | 0102715 A1 | 1/2001 |
| WO | 0148387 A1 | 7/2001 |
| WO | 0151870 A1 | 7/2001 |
| WO | 0188381 A1 | 11/2001 |
| WO | 0243980 A2 | 6/2002 |
| WO | 0246621 A2 | 6/2002 |
| WO | 03048627 A1 | 6/2003 |
| WO | 03052302 A3 | 6/2003 |
| WO | 03106816 A1 | 12/2003 |
| WO | 2004025122 A1 | 3/2004 |
| WO | 2004033906 A1 | 4/2004 |
| WO | 2004081380 A2 | 9/2004 |
| WO | 2005014324 A3 | 2/2005 |
| WO | 2005061904 A1 | 7/2005 |
| WO | 2005068849 A1 | 7/2005 |
| WO | 2005075233 A2 | 8/2005 |
| WO | 2005087567 A1 | 9/2005 |
| WO | 2005088137 A1 | 9/2005 |
| WO | 2005095800 A1 | 10/2005 |
| WO | 2006006985 A1 | 1/2006 |
| WO | 2006011835 A1 | 2/2006 |
| WO | 2006011836 A1 | 2/2006 |
| WO | 2006027938 A1 | 3/2006 |
| WO | 2006038968 A1 | 4/2006 |
| WO | 2006/055978 A1 | 5/2006 |
| WO | 2006107242 A1 | 10/2006 |
| WO | 2006137761 A1 | 12/2006 |
| WO | 2007081275 A1 | 7/2007 |
| WO | 2007081276 A1 | 7/2007 |
| WO | 2007081277 A1 | 7/2007 |
| WO | 2007081278 A1 | 7/2007 |
| WO | 2007081279 A1 | 7/2007 |
| WO | 2007081280 A1 | 7/2007 |
| WO | 2007081281 A1 | 7/2007 |
| WO | 2007086783 A1 | 8/2007 |

* cited by examiner

HYDRAULIC DRIVE SYSTEM

CROSS-REFERENCE TO RELATED APPLICATIONS

The present application is a continuation of U.S. patent application Ser. No. 11/291,753 filed Dec. 1, 2005, now U.S. Pat. No. 7,516,613 issued Apr. 14, 2009, which claims benefit of U.S. Provisional Application No. 60/632,176 filed on Dec. 1, 2004, U.S. Provisional Application No. 60/632,178 filed on Dec. 1, 2004 and U.S. Provisional Application No. 60/677,103 filed on May 3, 2005. All prior applications are herein incorporated by reference in their entirety.

FIELD OF THE INVENTION

The present invention relates to energy transmission systems and more particularly to such systems utilizing hydraulic fluid as an energy transfer medium.

BACKGROUND OF THE INVENTION

It is well-known to transfer energy from a source such as a motor or internal combustion engine to a load through the intermediary of hydraulic drive system. Such systems will typically have a pump driven by the source and a motor connected to the load. By adjusting the hydraulic flow between the pump and the motor it is possible to impart movement to the load, maintain it in a fixed position and otherwise influence its disposition.

The control of fluid flow is typically accomplished by a valve mechanism, which in its simplest form simply opens or closes the flow between the pump and motor and thereby regulates movement of the load. Such valve systems are relatively inefficient in terms of the energy dissipated across the valve. In a typical installation, the valve would be closed centred requiring the pump to deliver pressure against a relief valve. The energy provided to the fluid is thus dissipated as heat. In an open centre arrangement, careful manufacture of the valve is required in order to obtain the transition between the zero flow and full flow whilst retaining control of the load and metering of the flow across the valve causes loss of energy.

The valves used to control flow therefore are relatively complicated and made to a high degree of precision in order to attain the necessary control function. As such, the valves tend to be specialized and do not offer flexibility in implementing different control strategies. Most significantly, since the control is achieved by metering flow across an orifice there is inherently significant energy loss when controlling fluid flow. The control valve regulates movement by controlling flow across a restricted port at the inlet to the device. Because the control valve is typically a one piece spool, a similar restricted port is presented to the exhaust flow and results in a significant energy loss.

In order to reduce the operating forces required by a valve, is known to utilize a servo valve in which a pilot operation is used to control the fluid flow. In such an arrangement, a pivot valve balances a pair of pilot flows and can be moved to increase one flow and decrease the other. The change in flows is used to move a control valve and operate the hydraulic device. The force required to move the pilot valve is less than that required for the control valve and therefore enhanced control is obtained. However, there is a continuous flow at high pressure through the pilot valve resulting in significant losses. The control valve itself also suffers deficiencies of energy loss due to metering flow across restrictive ports and therefore, although it offers enhanced control, the energy losses are significant.

It is therefore an object to the present invention to obviate or mitigate the above disadvantages.

SUMMARY OF THE INVENTION

In general terms, the present invention provides a hydraulic drive in which flow from an actuator is controlled by a variable capacity hydraulic machine. The machine is pressure compensated so as to maintain a pressure in the actuator. A control signal is provided to adjust the maintained pressure and thereby regulate flow from the actuator.

According therefore to one aspect of the present invention there is provided a hydraulic drive system comprising an actuator having a pair of chambers disposed to apply a motive force derived from fluid in chambers to move a drive member in opposite directions. Each chamber is connected to a respective one of a pair of variable capacity hydraulic machines, each of which has a pressure compensating control operable to adjust the capacity of the machines to maintain a predetermined pressure in the chambers. An overriding control is operable upon at least one of the machines to vary the capacity thereof and permit egress of fluid from one of the chambers and corresponding movement of the drive member.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
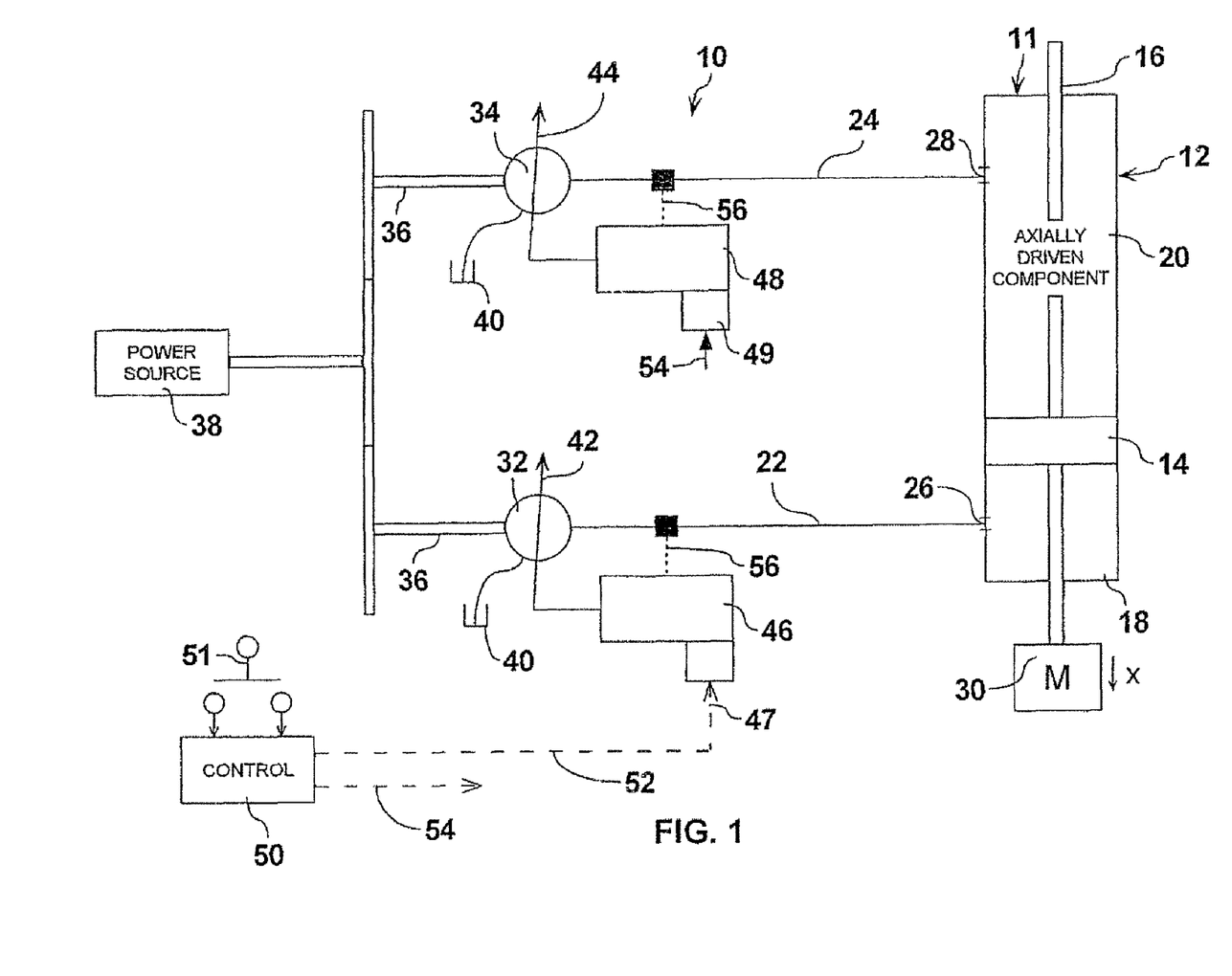
FIG. 1 is a schematic representation of hydraulic drive for a linear actuator.

Referring therefore to FIG. 1, a hydraulic drive system 10 includes an actuator 11 having a cylinder 12 with a piston 14 supported within the cylinder 12. The piston 14 is connected to a piston rod 16 that extends from opposite ends of the cylinder 12. The piston 14 subdivides the cylinder 12 into chambers 18 and 20 which are connected to supply lines 22, 24 by ports 26, 28 respectively. The rod 16 is connected to a load 30 shown schematically as a horizontal sliding mass.

The supply lines 22, 24 are connected to the outlets of a pair of variable capacity hydraulic machines 32, 34. The machines 32, 34 are typically a swashplate device in which the angle of inclination of a swash plate determines the capacity of the machine. Alternatively, the devices could be a radial piston pump in which variation in the eccentricity of the control ring determines the capacity of the pump. The machines 32, 34 are reversible to permit each to operate in a pumping mode or motoring mode. The details of such machines are known and need not be described further. A particularly beneficial embodiment of such machines is described in co-pending application PCT/US2005/004723, the contents of which are incorporated by reference.

The machines 32, 34 are coupled by a common drive shaft 36 to a prime mover 38, typically an electric motor or internal combustion engine. The machines 32, 34 receive fluid from and return fluid to a sump 40. Each of the machines has a capacity adjusting mechanism 42, 44 whose disposition may be adjusted by a swashplate adjusting motor 46, 48. The motors 46, 48, are independently operable and are controlled by respective control units 47, 49. As can be seen in greater detail in FIG. 2, each control unit 47, 49 receives a control signal from a control module 50 as a result of manipulation of a manual control 51. The control module 50 communicates with the control units 47, 49 through signal lines 52, 54 respectively. Each of the signal lines 52, 54 includes a reference pressure signal 61 and a swashplate position feedback signal 57. Input to the control module is provided by a controller 51, which is illustrated as a manual control although it will be appreciated that this could be generated automatically from other control functions or as part of a programmed sequence.

Figure 2:
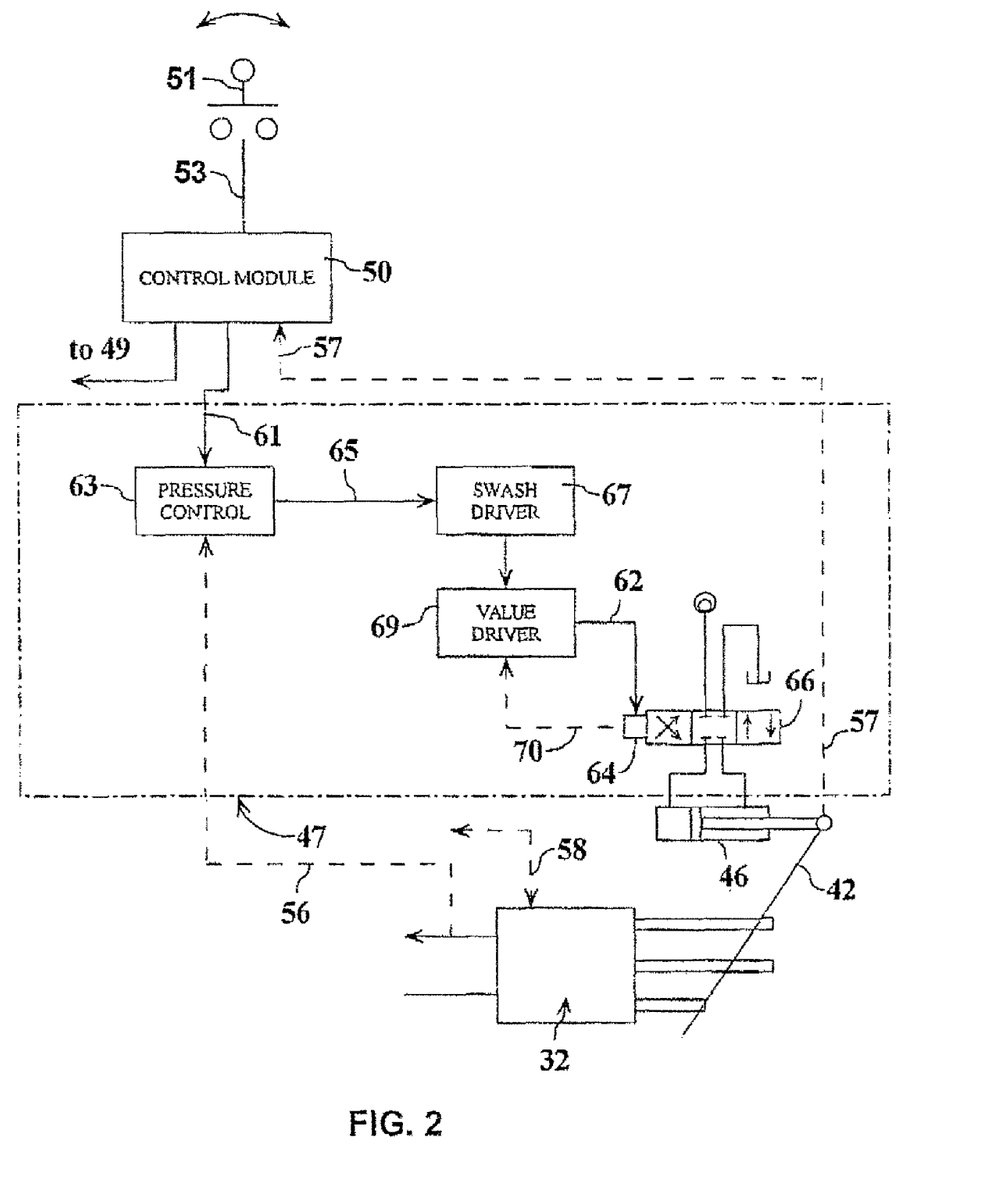
FIG. 2 is a representation in greater detail of a component used in the drive of FIG. 1.

The control units 47, 49 are similar and therefore only one will be described in detail. The control units 47, 49 receive a pressure feedback signal from the supply lines 22, 24 respectively through an internal signal line 56. Feedback signals are also obtained for swashplate displacement through signal line 57 and rotational speed of the machine through signal line 58.

The pressure reference signal 61 and pressure feedback signal 56 are compared at a pressure control driver 63 that is connected through control line 65 to a swashplate driver 67. The swashplate driver 67 produces an output error signal 68. The error signal 68 is applied to a valve driver 69 whose output is a drive signal 62.

The drive signal 62 is applied to an actuating coil 64 of a closed centre valve 66 that controls movement of the motor 46 and therefore the capacity of the respective machine 32. The valve 66 has a valve position feedback signal 70 that is fed to the valve driver 69 so that the drive signal 62 is the difference between the error signal 68 and the valve position signal 70.

In operation, the load 30 is initially at rest and the capacity adjusting members 42, 44 are initially positioned with the machines 32, 34 at essentially zero capacity with maximum system pressure, typically in the order of 5,000 p.s.i. at each of the ports 26, 28. The machines 32, 34 attain this condition as the reference signal 61 is applied at the pressure control driver 63 and any loss of pressure will provide a signal to swashplate driver 67 to move the swashplate to supply fluid. This will cause an increase in pressure sensed in feedback line 56 and a net zero sum at the driver 67. In this condition, the drive shaft 36 simply rotates the machines 32, 34 without producing an output at the supply lines 22, 24. The fluid is essentially locked within the chambers 18, 20 and therefore movement of the piston 14 relative to the cylinder 12 is inhibited. Any leakage from the system causes a drop in pressure on the respective line 22, 24 and the consequential error signal from the pressure control driver 63 to adjust the respective member 42, 44 to maintain the pressure.

In order to move the load 30, the manual control 51 is moved in the direction in which the load is to be moved which is indicated by arrow X in FIG. 1. For the purpose of the initial description, it will be assumed that the control 51 provides a simple fixed value step function, i.e. "on" or "off" to the control module 50. Subsequent embodiments will describe alternative control strategies. Upon movement of the manual control 51, a signal 33 is provided to the control module 50 which generates corresponding signals in the control lines 53, 54, in this case 52, to effect movement in the required direction.

The pressure reference signal 61 is set to require a nominal minimum pressure, e.g. 100 psi at port 26, so that the signal on control line 65 also indicates an increase in capacity of the machine 32 in the motoring mode to reduce pressure at port 26. The swashplate driver 67 thus provides an output error signal 68 to the valve driver 69 indicating a required position of the valve that causes the machine 32 to be placed in the motoring mode to reduce the pressure in the port 26 and allow fluid to flow from the chamber 18. The valve position feedback signal 70 indicates a neutral position of the valve 66 so a valve drive signal 62 is applied to the actuator 64 to reduce the error and thereby open the valve 66.

Initially, the capacity of the machine 32 will increase sufficiently for the pressure at port 26 to drop and the signal 57 to correspond to the reference signal 61 from the controller 50. The control signal 65 is thus reduced to zero. The valve position feedback signal 70 thus acts through the valve driver 69 to close the valve 66 and inhibit further movement of the swashplate 42. Any further increase in the capacity of the machine will reduce the pressure at port 26 below that set by the reference pressure 61 and the control signal 65 will act to reduce the capacity and restore the pressure to that of reference value 61.

As the pressure at port 26 decreases, the pressure in chamber 20 is maintained at the maximum set value as the reference signal 61 associated with control unit 49 has not been modified. The pressure differential acting across piston 14 initiates movement of the piston 14, which, in turn, reduces the pressure at port 28. The pressure control drive 63 of the control unit 49 thus generates a control signal 65 that produces an output error to the swashplate driver 67 and causes the machine 34 to increase capacity in a pumping mode to maintain the reference pressure. Movement of the piston 14 induces a flow from the port 26 and the pressure at the port 26 will again increase above the nominal set pressure. The pressure control signal 65 is then operative through the swashplate driver 67 to increase the capacity of the machine 32 in the motoring mode whilst maintaining the required nominal pressure. The pressure differential across the piston 14 will thereby accelerate the mass 30. As the mass 30 accelerates, the capacity of the machine 34 will continue to increase in the pumping mode to supply fluid to maintain the reference pressure and the capacity of the machine 32 will likewise increase in the motoring mode to maintain the nominal set pressure. The mass 30 will continue to accelerate and the capacity of the machines 32, 34 adjusted under the pressure compensating control to maintain their respective set pressures at the ports 26, 28. When the machine 34 attains maximum capacity, the mass is no longer capable of being accelerated but a steady state velocity is attained in which pressure at the port 28 is maintained at the maximum reference pressure and the pressure at the port 26 is maintained at the nominal low pressure.

In the simplest form of control provided by the manual control 51, the actuator 10 will continue to move the mass 30 in the direction set by the control 50. When the desired position of the mass 30 has been obtained, as observed by the operator, the manual actuator 51 is returned to a neutral position causing the reference pressure 61 to be increased to the maximum pressure. To attain the pressure indicated by reference signal 61, the capacity of the machine 32 will be reduced to cause the pressure in the port 28 to increase to the set value. The pressure differential across the piston 14 is removed and the mass 30 decelerates. The capacity of the machine 34 will therefore also be reduced to maintain the pressure at the set value and as the mass decelerates, the machines 32, 34 both reduce progressively to minimum capacity. The pressures at ports 26, 28 are then identical and maintain the load 30 stationary. It should be noted that during movement, modulation of the reference pressure 61 is only applied to the machine 32 and the machine 34 simply operates in a pressure compensated mode to follow the movement of the piston 14.

Movement of the manual control 51 in the opposite direction will likewise apply a control signal through the signal line 54 to generate a drive signal at valve 66 of control unit 49 and a reduction of the required pressure to increase the capacity of the machine 34 and produce a corresponding motion in the opposite direction.

During movement of the load 30, the swashplate position feedback signal 57 is supplied to the control module 50 to provide an indication of the mode of operation of the machine, i.e. pumping or motoring, and to provide for anticipatory control in modifying the reference pressure signal 61.

Figure 9:
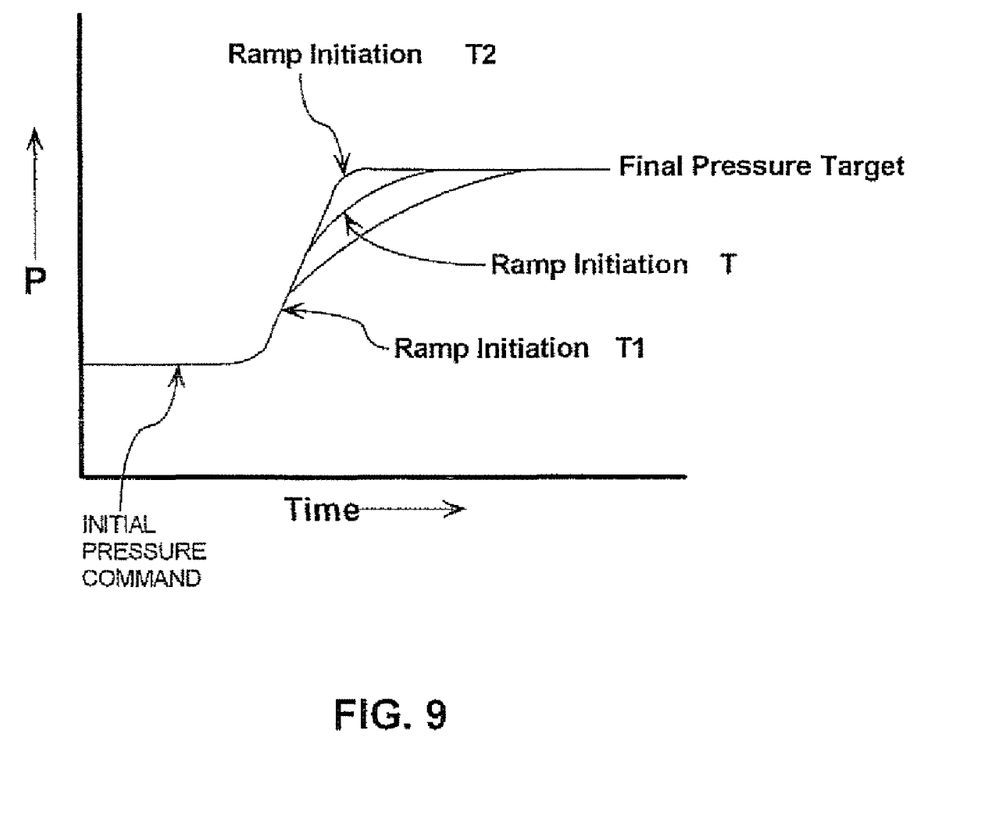
FIG. 9 is a response curve showing different responses under different operating conditions.

In order to accommodate differing operating conditional, as shown in FIG. 9, the rotational feedback signal 58 is used to vary the initiation of the ramp function and obtain the optimum response in the pressure control. As the pressure rises in the supply in response to an increase in the reference signal 61, as sensed in pressure sensing line 56, a ramp initiation point T is reached at which the control 50 modifies the pressure signal to control 63. The control 50 also receives the speed feedback signal 58 and modifies the initiation point, as indicated by T1 and T2 in inverse proportion to the sensed speed. At low speed of rotation, the pressure gain (rate of pressure increase) is low since the time for system response is lengthened in view of the relatively low rate of pumping and motoring within the machines 34, 32. However, at higher rotational speed, the pressure gain rate is much higher. Accordingly, at higher RPM, the initiation point T1 is at a lower pressure and at lower RPM, the initiation point T2 is at a higher pressure. In this way, the system response may be matched to the varying operating conditions of the system.

The provision of machine rotational speed through feedback 58 may be used to vary the response of the machines to changes in the reference pressure signal 61. To provide optimum response, i.e. inhibit overshoot and minimize undershoot, the control signal to valve 66 is modified by a ramp function.

Alternatively, the angular disposition of the swashplate 42, 44 may be used to modify the onset of the modification. In this case, as the pressure rises in the supply in response to an increase in the reference signal 61, as sensed in pressure sensing line 56, a ramp initiation point T is reached at which the control 50 modifies the pressure signal to control 63. The control 50 also receives the swashplate feedback signal 57 and modifies the initiation point, as indicated by T1 and T2 in inverse proportion to the sensed position. At low swashplate angles, the pressure gain (rate of pressure increase) is low since the time for system response is lengthened in view of the relatively low rate of pumping and motoring within the machines 34, 32. However, at higher swashplate angles, the pressure gain rate is much higher. Accordingly, at higher swashplate angles, the initiation point T1 is at a lower pressure and at lower swashplate angles, the initiation point T2 is at a higher pressure. In this way, the system response may be matched to the varying operating conditions of the system.

The provision of machine rotational speed through feedback 58 may be used to vary the response of the machines to changes in the reference pressure signal 61. To provide optimum response, i.e. inhibit overshoot and minimize undershoot, the control signal to valve 66 is modified by a ramp function.

It will be appreciated by utilizing the variable capacity machines 32, 34 on a common drive, the energy of fluid discharged from the collapsing chamber may be redirected through the shaft 36 to either the prime mover, the machine that is in pumping condition or additional machines as will be described in further detail below.

The flow of fluid from the collapsing chamber (18 in the above example) produces a torque as it flows through the respective machine 32. The torque produced will depend in part on the capacity of the machine and is applied to the drive shaft 36 to supplement the torque applied by the prime mover 38. In some cases, for example where movement of the load 30 is assisted by gravity, the torque obtained from one machine may be sufficient to maintain the set pressure in the other machines but in other cases energy from the prime mover 38 will be required in addition to the torque recovered. Where additional torque is required, the prime mover control will sense an increased demand (e.g. by a reduction in speed in the case of a compression ignition internal combustion engine) and respond accordingly.

The deceleration of the mass 30 also provides a source of energy that may be recovered through the mechanical linkage of the machines 32, 34. As noted above, as the control 51 is returned to the neutral position, the machine 32 is conditioned to maintain the maximum reference pressure. Continued movement of the mass 30 due to its kinetic energy must therefore act against the maximum pressure through the machine 32 which is still in the motoring mode. The machine 32 is thus driven by the fluid expelled from the chamber 18 and a significant torque is applied to the drive shaft 36. Torque is applied until the mass is brought to rest with both swashplates returned to essentially zero capacity.

In some situations, the load 30 may be decelerated at a maximum rate by the operator moving the control 51 in the opposite direction, i.e. through the neutral position. Such movement would cause the signals applied through signal line 54 to indicate a nominal low pressure is required in the port 28 and a maximum pressure in the port 26. The machine 32 thus decreases its capacity to maintain the maximum pressure and the machine 34 similarly reduces its capacity but at a rate that maintains only a nominal low pressure in the port 28. The maximum pressure differential is then applied to decelerate the mass and bring it to rest. The swashplates move progressively to zero displacement at which time the control 51 may be released and an equal pressure balance applied to each chamber. If the control 51 is maintained in the reversed position, the machine 34 will move to a motoring mode and the machine 32 to a pumping mode and movement of the load in the opposite direction will commence.

As discussed above, the manual control 51 is either 'on' or 'off' but a proportional signal may be incorporated in the manual control 51 to obtain a progressive response such that the rate of movement of the load is proportional to the movement of the control 51 from neutral. In this case, the magnitude of the control signal 53 is proportional to the movement of the control 51. The signal 52 will establish a reference pressure signal for the pressure compensation that is proportional to the displacement of the control 50. Assuming that movement of the mass in the direction of arrow X is required, the capacity of the machine 32 will be adjusted so that the pressure at port 26 attains this value. The pressure at port 28 is maintained at the reference level so that the pressure differential across the piston 14 may thus be modulated and the acceleration controlled.

Figure 3:
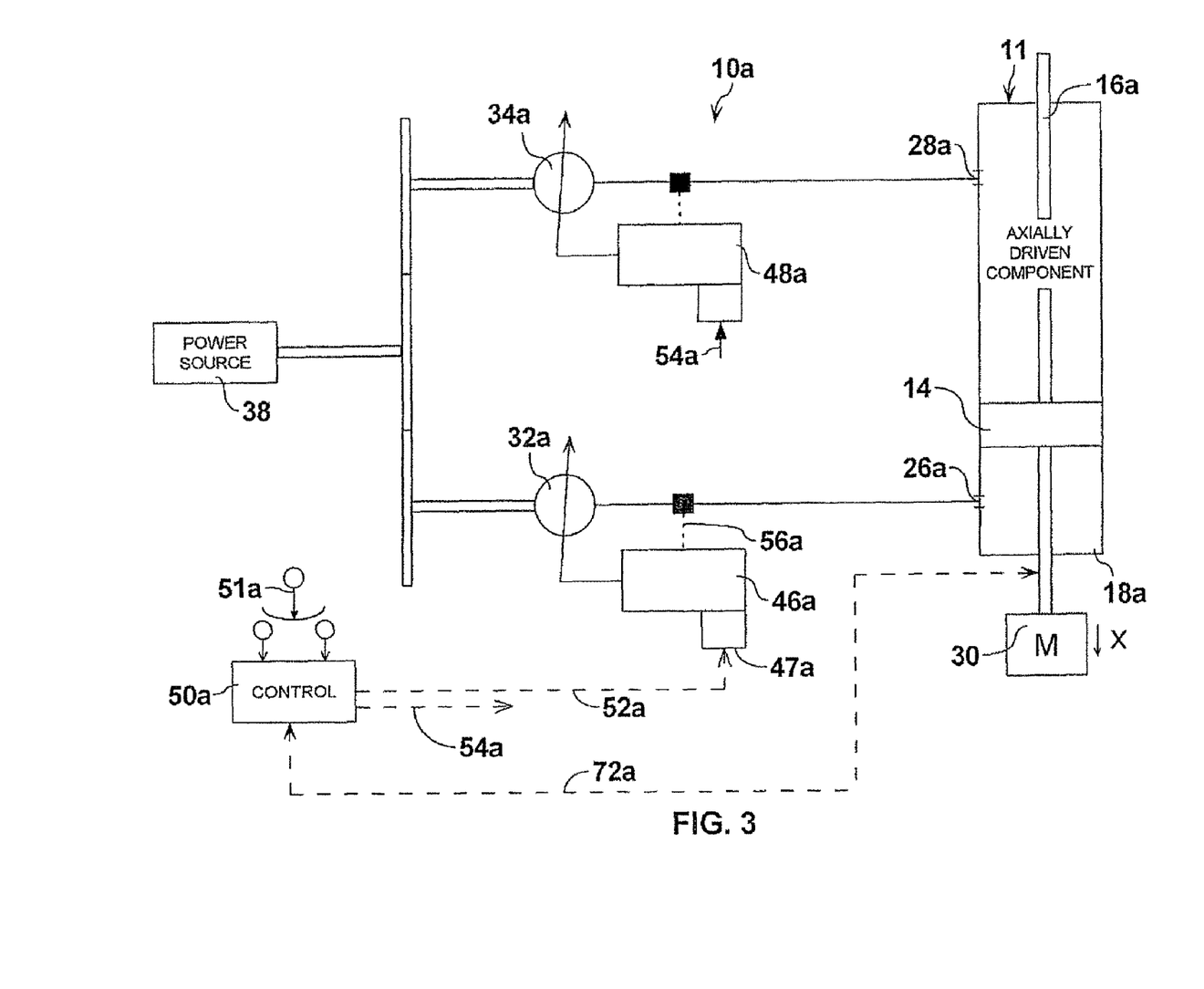
FIG. 3 is a schematic representation similar to FIG. 1 of a linear actuator with a modified control.

The arrangement shown in FIG. 1 provides a simple manual feedback but the control signal may be modified to provide for a position control of actuator 18 as illustrated in FIG. 3 in which like reference numerals are used to denote like components for the suffix 'a' added for clarity. In the embodiment of FIG. 3, the manual control 51a provides a proportional control signal to control module 50a. A position feedback signal 72a is obtained from the piston rod 16a of the actuator 11a and is also fed into the control 50a to obtain an error signal indicating the difference between the desired position, as represented by manual control 51a, and the actual position represented by the signal 70a. The control module 50a generates a pressure reference signal 61a on a control signal line 52a, which is applied to the respective control unit 47a of motor 46a to condition the machines 32a, and move the piston 14a in the required direction. Assuming the load 30a is to be moved in the direction of arrow X shown in FIG. 3, the machine 32a increases capacity in an attempt to attain a reduced pressure at port 26a corresponding to that set by the reference signal 61a and fluid flows from the chamber 18a. The machine 34a applies the maximum reference pressure to move the load 30a and varies the capacity to maintain that pressure. As the desired position is obtained, the position signal 72a varies and the difference between the manual control 51a and position signal 72a is reduced to essentially zero. The swashplates return progressively to zero displacement and any movement from this desired position produces an error signal at control module 50a to condition an appropriate pressure reference signal 61a and return the load to the desired position. The capacity of the machine 32a is thus progressively reduced to increase the pressure and a corresponding decrease in capacity of machine 34a until the load 30a is brought to rest at the desired location.

Figure 4:
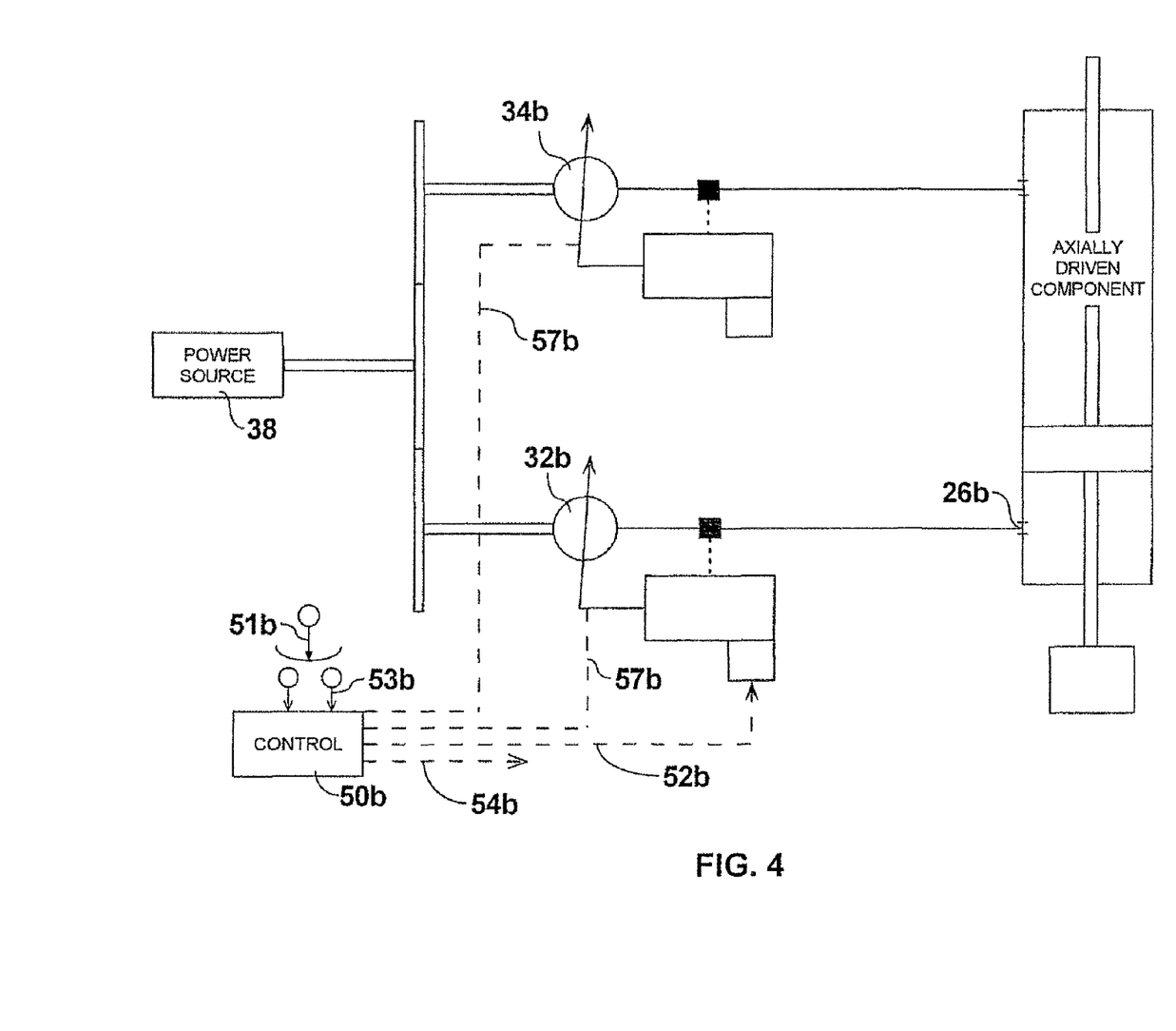
FIG. 4 is a schematic representation of a linear actuator similar to FIG. 1 implementing a further control function.

The control of the arrangement of FIG. 1 may also be modified to provide for a velocity control in which the maximum velocity is limited. Like components will be denoted to like reference numeral with a suffix b added for clarity. In the embodiment of FIG. 4, rather than the monitor the position of the load, as described in FIG. 3, the capacity of the machine 32b, 34b is monitored and used as an indication of velocity. Referring therefore to FIG. 4, the manual control at 51b provides an output signal proportional to the desired velocity to be obtained which produces a control signal 52b causing the machine 32b to move to a motoring mode and the reference pressure reduced to a nominal low value. The capacity of machine 32b is increased in the motoring mode to reduce the pressure at port 26b, resulting in acceleration of the load.

The capacity of the machines 34b, 32b increases until the indicated capacity through feedback signal 57b corresponds to that set by the control 51b. The error signal is thus removed and the capacity of the machine 32b reduced to establish the reference pressure. The reference pressure of machine 34b is at a maximum value so that the load is again accelerated until the capacity of the machine 32b as indicated through feedback signal 57b matches the input signal 52b from control 51b. As the machines reduce capacity progressively, the swashplate position feedback 57b again introduces an error signal that causes the machine 32b to increase capacity so as to reduce pressure Accordingly, a steady velocity, intermediate that limited by the maximum capacity of the machines, is attained. Such a control may be useful for an automated process such as a machine tool drive or the like.

The above linear actuators have been described with a double sided actuator but it will be apparent that they may equally well be used with the single sided actuator i.e. one in which the piston rod projects from one side of the actuator and the chambers have a different area. The corresponding reference signals 61 may be adjusted in proportion to the difference in areas between the rod and piston side chambers to control movement of the cylinder in a manner similar to that described above with respect to FIG. 1.

Figure 5:
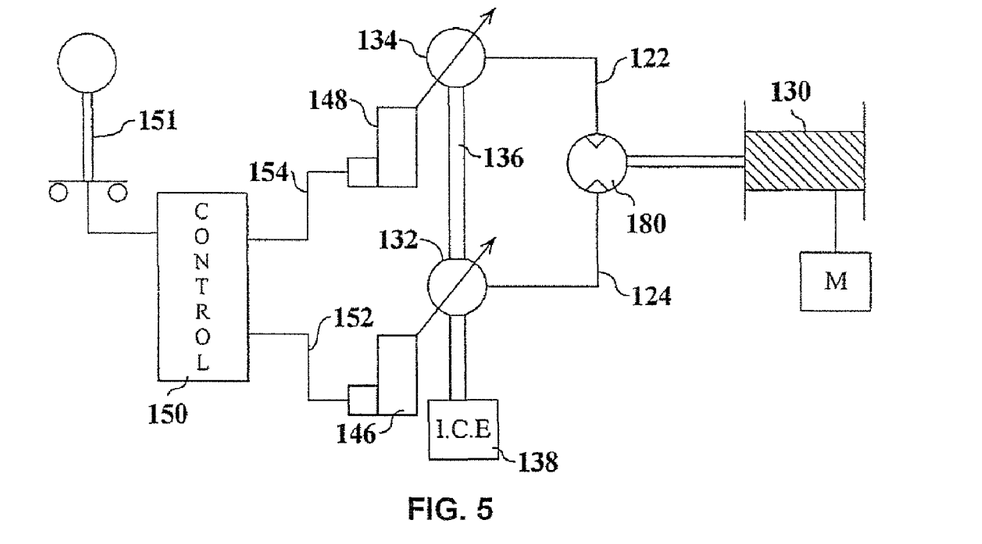
FIG. 5 is a schematic representation of a rotational drive.

A similar control structure may be utilized for a rotary drive, such as might be used for a winch or similar application. Such arrangement is shown in FIG. 5 in which like reference numerals will be used to denote like components but with a prefix 1 for clarity of description. A pair of variable capacity hydraulic machines 132, 134 are hydraulically connected through hydraulic lines 122, 124 to a fixed capacity rotary machine 180. A prime mover 138 is mechanically connected to each of the machines 132, 134 and a winch assembly 130 connected to the machine 180. The machines 132, 134 are controlled by motors 146, 148 with control signals 152, 154 being applied by a control module 150. With the mass stationary, each of the adjusting members 142, 144 are set at essentially zero capacity with a hydraulic lock in the supply lines 122, 124. The pressure compensation of the machines ensures that pressure is maintained in the system to lock the motor and inhibit rotation of the winch.

Upon a signal from the actuator to rotate the winch 130, the signal to the motor 132 indicates a reduced pressure requiring an increased capacity in the motoring mode. As fluid is delivered in the supply line 122, the pressure compensated control of the machine 134 adjusts to maintain the pressure at the set pressure controlled causing rotation of the winch assembly 130. The positional and velocity controls indicated above may be utilized to control the movement of the load and maintain it in a desired position. Once the position has been attained, the error signal is removed, either by release of the manual control 151 or feedback from the position or velocity control, the swash plates 144, 142 return progressively to a essentially zero position in which no energy is transferred through the system but the load is maintained via pressure on both sides of the motor.

It will be seen therefore that in each of the above embodiments, a pair of pressure compensated variable capacity machines may be utilized to control operation of an actuator.

The pressure compensation permits a minimum of energy to be utilized to hold the actuator and, by overriding the set pressure on the discharge of the actuator, a controlled movement of the actuator is obtained. Modulation of only one of the machines is required with the other machine following to maintain a set pressure and apply a motive force. The mechanical coupling of the machines may be used to enable energy to be recovered from the efflux of fluid from the actuator and applied to the machine providing motive force.

Figure 6:
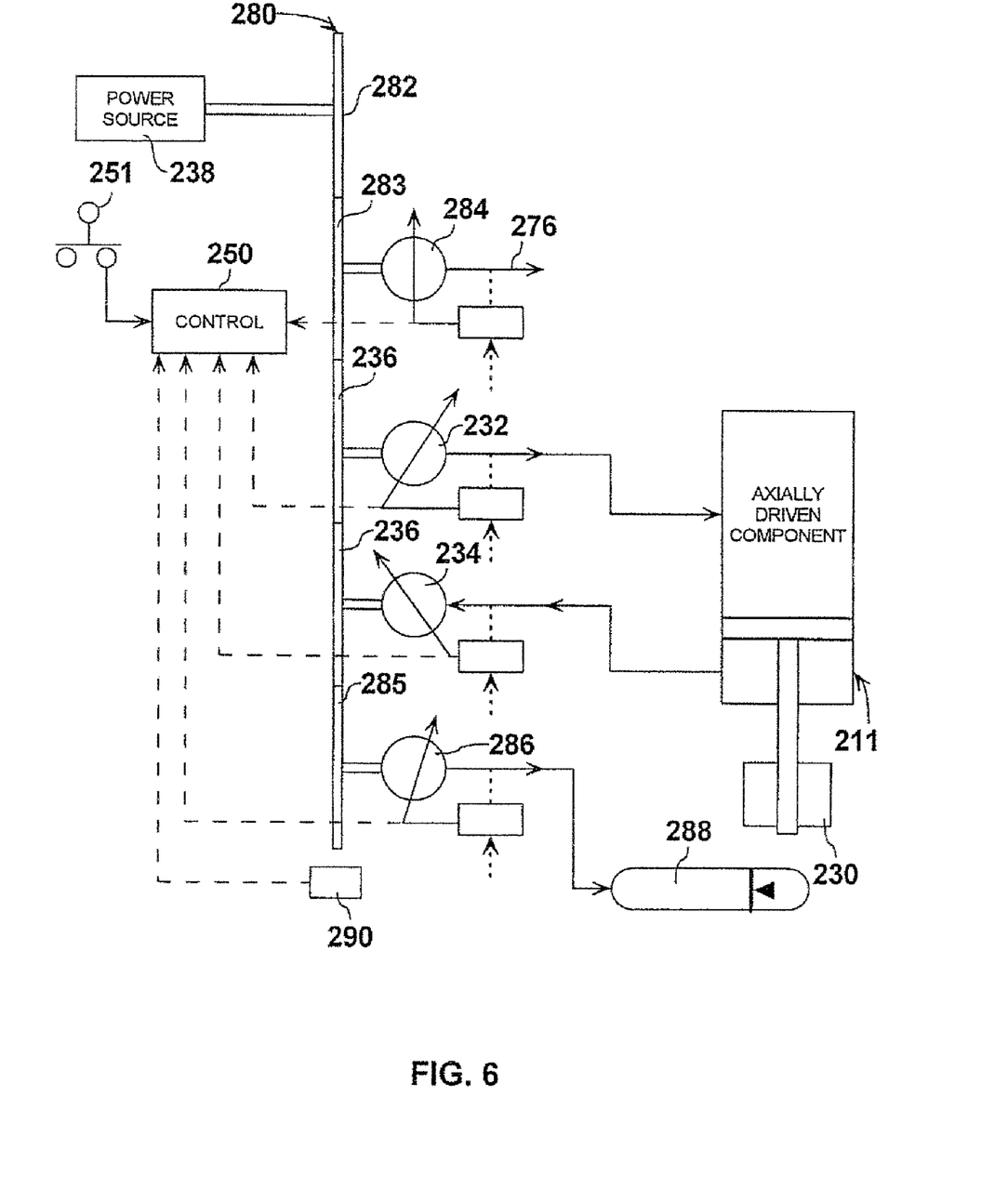
FIG. 6 is a schematic representation of a further embodiment of drive with enhanced energy recovery capabilities.

As noted above, the mechanical linking of the machines 32, 34 permits energy recovery under certain conditions. The energy recovery may be enhanced by adoption of the arrangement shown in FIG. 6. Like reference numerals will be used to denote like components with a prefix 2 added for clarity. In the embodiment of FIG. 6, a pair of variable capacity machines 232, 234 are connected to an actuator 211 connected to a load 230. Each of the machines 232, 234 include pressure compensating controls and are operated from a manual control 251 through control 250 as described above. The machines 232, 234 are mechanically linked by a pair of meshing gears 236 so that they rotate in unison. Drive for the machines is provided by a prime mover 238 through a gear train 280, including gears 282, 283.

An auxiliary hydraulic drive 284 is connected to the gear 283 and supplies fluid to an auxiliary service 276. The drive 284 may be fixed or variable capacity and may be controlled as the machines 232, 234 if appropriate. The gear train 280 also includes a gear 285 that drives an additional variable capacity hydraulic machine 286. The machine 286 is connected to a hydraulic accumulator 288 that is operable to store and discharge fluid through the machine 286 and thereby absorb energy from or contribute energy to the gear train 280. A speed sensor 290 is provided to monitor the speed of the gear train 280 and interface with the control module 250

In operation, the accumulator is initially empty and it is assumed that the auxiliary drive 284 is supplying a steady flow of fluid to the service 276. The mass 230 is moving at a constant velocity under the action of the machines 232, 234 and the prime mover 238 is supplying energy to the gear train 280 sufficient to fulfill the requirements. If the mass 230 is decelerated at a maximum rate, as described above, the machine 232 is conditioned to a maximum pressure in the motoring mode and significant torque is generated to accelerate the drive train 280. Initially the prime mover defuels, assuming it is a compression ignition internal combustion engine, and the torque supplied by the machine 232 is used to drive the machine 284 and supply fluid to the auxiliary service 276. If the torque cannot be absorbed in this manner, the gear train will accelerate and a speed sensor 290 signals the control 250 to increase the capacity of the additional machine 286 in a pumping mode. The machine 286 therefore delivers fluid under pressure to the accumulator 288 at a rate that absorbs the torque available and maintains the desired speed of the gear train 280.

As the mass 230 is brought to rest, the torque supplied to the gear train decreases and the speed drops. The control 250 causes the machine 286 to reduce the pumping action and return to essentially a zero capacity due to lack of energy induced via the machine 232 with energy stored in the accumulator 288. Similarly, if during deceleration, the auxiliary service 276 demands more energy, the speed of the gear train 280 will decrease and an adjustment made to the machine 286. The energy available from the machine 232 is thus redirected to the auxiliary service 276 and the remainder, if any, is available to pump the accumulator 288.

If the load imposed by the service 276 continues to increase, the energy stored in the accumulator 288 is made available to maintain the desired speed of the gear train 280. A continuing increased load will again cause the speed of the gear train 280 to decrease and cause the control 250 to move the additional machine 286 in to a motoring mode. The pressurised fluid available in the accumulator is applied to the machine 286 to generate a torque in the gear train and thereby maintain the desired speed. The swashplate of the machine 286 is modulated to maintain the speed at the desired level until all energy (or a low threshold value) in the accumulator 288 is dissipated. At that time, further energy requirements are met by fueling the prime mover 238. The mechanical connection of the accumulator 288 through the machine 286 and its modulation to maintain the speed of the gear train 280 within desired limits enhances the utilisation of the recovered energy.

Figure 7:
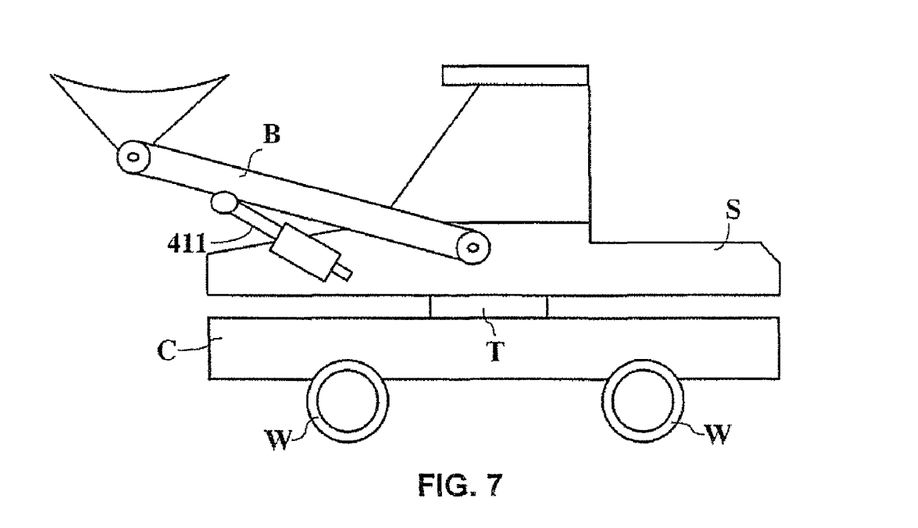
FIG. 7 is a view of vehicle incorporating a hydraulic transmission.
Figure 8:
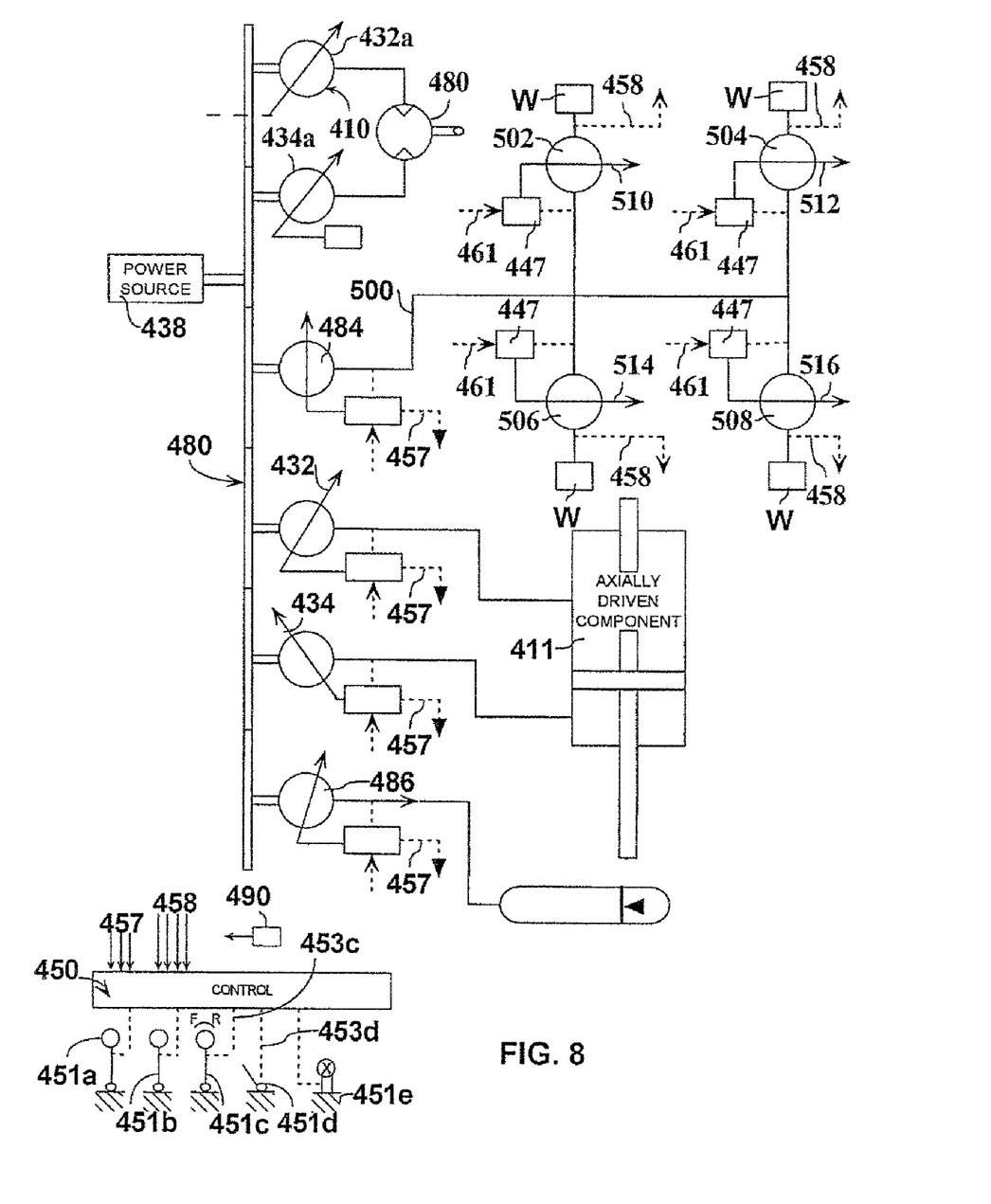
FIG. 8 is a schematic representation of the hydraulic transmission utilised in FIG. 7.

The systems described above may be integrated in to the control strategy of more complex machines, as illustrated in FIGS. 7 and 8 in which like reference numerals will be used with a prefix "4" to denote like components. Referring therefore to FIG. 7, a vehicle V includes a chassis structure C supported upon drive wheels W. A superstructure S is located on the chassis structure C and is rotatable about a vertical axis on a turntable T. A boom assembly B is pivotally mounted to the superstructure S for movement in a vertical plane. A boom actuator 411 is connected between the superstructure S and the boom assembly B and is operable to elevate and lower the boom.

The vehicle V includes a prime mover 438 connected to a hydraulic drive system 410 through a gear train 480 as shown in greater detail in FIG. 8. As can be seen from FIG. 8, the prime mover 438, which may be an electric motor or internal combustion engine, provides an input into a mechanical gear train 480 that transmits the drive to a number of variable capacity hydraulic machines 432, 432a, 434, 434a, 484 and 486. Each of the hydraulic machines 432, 432a, 434, 434a, 484 and 486 are of variable capacity and have a capacity adjusting member 442, 443, 444, 445 respectively. The machines 432, 432a, 434, 434a, 484 and 486 are typically adjustable swashplate machines having an inclinable swashplate acting upon axially reciprocating pistons within a rotating barrel as discussed above with reference to the previous embodiments.

Drive for the boom actuator 411 is provided by a pair of machines 432, 434 through a manual control 451a that controls flow to either side of the piston 414 as described above with reference to FIGS. 1, and 2. Similarly, the turntable T is operated by a rotary motor 480 through a manual control 451b that controls a pair of machines, 432a, 434a in the manner described above with respect to FIG. 5. An additional machine 486 transfers energy between an accumulator 488 and gear train 480 as described above with respect to FIG. 6.

The hydraulic machine 484 is pressure compensated as described above with respect to FIG. 2 and the auxiliary service 476 is connected by a supply conduit 500 to wheel drives 502, 504, 506 and 508. Each of the wheel drives 502, 504, 506 and 508 drive a respective one of the wheels W and are each variable capacity reversible hydraulic machines with control units 547 similar to those described in reference to FIG. 2. Each has an adjusting member 510, 512, 514, 516 controlled by respective valves. The hydraulic machines 510-516 are of similar construction to the machine 32, 34, and need not be described in further detail.

The capacity of each of the drives 502-508 is controlled by a swashplate position signal 461 generated by a control module 450. Each of the drives 502-508 also provide a speed of rotation signal 458 on signal lines 452 for monitoring the operation of each machine.

Operator control of the transmission is provided to control module 450 via manual controls 451c, 451d, 451e. The manual control 451c controls the direction and speed of propulsion of the vehicle V, the control 451d controls the braking of the vehicle V, the control 451e steers the vehicle V. These are typical controls and it will be appreciated that other commonly used interfaces could be employed.

The operation of the hydraulic drive system will now be described assuming initially that the vehicle is at rest and the boom locked in a lowered position. With the vehicle at rest, the capacity of each of the machines 432,434,432a,434a is at essentially zero capacity and maintaining maximum set pressure. The wheel drives 502-508 similarly set at minimum capacity to deliver zero torque and the machine 484 is at essentially zero capacity maintaining a maximum pressure in the conduit 500. Essentially, this setting is simply sufficient to replenish any leakage within the system but, to produce no vehicle movement.

The accumulator 488 is fully discharged and the capacity of the additional machine 486 is at a minimum. With each of the machines 432, 434, 432a, 434a, 484, 486 at a minimum, the prime mover 30 is simply rotating the machine without producing any output and therefore is at minimum power requirements.

To initiate movement of the vehicle V, the operator moves the control 451c in the required direction of movement and provides an appropriate control signal 453c to the control module 450. Typically, this will be proportional signal indicative of not only the direction but the torque input at the wheels which will determine the rate of movement of the vehicle. The control module 450 provides a control signal 452 to the wheel drives 502-508 to attain a torque setting (displacement) corresponding to the input signal from the control 450. This will be a proportional torque setting indicating a corresponding proportional capacity of the machine. For maximum acceleration, this will correspond to a maximum displacement. As the capacity of the wheel drives 502-508 increases under the control of the respective swashplates 510-516, the pressure in the supply conduit 500 decreases causing the pressure compensation of the machine 484 to increase the capacity of that machine. The resultant torque from drives 502-508 enabled by flow of fluid through the conduit 500 causes rotation of the wheel W and propulsion of the vehicle.

The capacity of the wheel drives 502-508 will continue to increase until the swashplate position feedback 457 indicates the desired capacity has been attained and the required torque is delivered at each wheel. During this time, the pressure within the conduit 500 will be maintained by increasing the capacity of the machine 484 under pressure compensating control. Unless otherwise interrupted, either by adjustment of the control 451c or increased load on the vehicle, the vehicle V will accelerate until the machine 484 reaches an equilibrium when the external loads match the torque available.

When the vehicle has attained the desired velocity, the operator releases the control 451c to reduce the capacity of the wheel drives 502-508 and consequently the torque, to inhibit further acceleration and maintain the desired velocity. The machine 484 reduces its capacity to maintain the pressure at the maximum value whilst maintaining a flow through the wheel motors. A steady state is reached at which the torque supplied to the wheels W matches the load on the vehicle V. Under certain conditions, for example coasting downhill, no torque is required to maintain the desired speed and the wheel drives 502-508 and machine 484 are returned to essentially zero capacity. In this condition, the vehicle is simply coasting with no net power supplied to the wheels 14.

To brake the vehicle V, the brake control 451d is actuated (which may be integrated with the control 451c if appropriate). The application of the brake control 451d generates a proportional signal 453d to the control 450 that conditions each of the wheel drives in to a pumping mode at a selected capacity. The swashplates 510-516 are thus moved from the motoring mode overcentre to the pumping mode and cause an increase in the pressure in the conduit 500. The machine 484 initially reduces its capacity and then goes overcentre in to a motoring mode under the action of pressure control to maintain the maximum set value. The swashplate feedback signal 457 holds the wheel drives at the capacity indicated by the braking control 451d and pumps fluid under the maximum pressure through the machine 484. The torque required to do this is derived from the momentum of the vehicle and therefore brakes the vehicle V. The conditioning of the machine 484 to a motoring mode results in energy being supplied from the machine 484 into the gear train 480.

The energy supplied to the gear train 480 causes the components of the gear train, including the prime mover, to accelerate. The speed of rotation of the gear train is monitored by speed sensor 490 and an increase in that speed is detected by the control module 450. This conditions the machine 486 associated with the accumulator 488 to move into a pumping mode and supply fluid under pressure to the accumulator 488. The displacement of the machine 486 is controlled to maintain the speed of the gear train 480 at the set speed. The accumulator is thus charged by the energy recovered from the braking of the vehicle.

The store of energy will depend upon the braking effort with the machine 486 modulating the capacity to maintain the speed of the gear train 480 at the desired level.

Upon removal of the braking control 451d and reapplication of the speed control 451c, wheel drives 502-508 are once again conditioned into motoring modes and the machine 484 reverts to a pumping mode to maintain the pressure in the conduit 500.

As the machine 484 moves to supply energy into the conduit 500, an initial decrease in the rotational speed of gear train 480 is sensed and the machine 486 is conditioned into a motoring mode to supply energy from the accumulator 488 into the gear train 480. The energy that has therefore been stored in the accumulator 488 during braking is made available to the vehicle transmission during a further acceleration cycle. Upon exhausting of the accumulator 488, a decrease in engine speed will be noted and the fuel supplied to the engine is modulated to maintain the speed constant.

The boom B is operated through modulation of the machines 432, 434. In order to extend the boom actuator 411, a control signal is sent from the operator 451a to the control 450 indication pressure and direction. Control 450 then adjusts the reference signal 461 applied to the pressure control 463 associated with machine 432. This causes the machine 432 to increase capacity in a motoring mode and thereby reduce the pressure to the low reference pressure. The machine 434 responds through its pressure control to increase its capacity in a pumping mode and extend the cylinder 411 as described above. The rate of movement may be adjusted by modulation of the adjustment member 451a to obtain the required rate of movement.

Upon lowering of the boom B, there is a converse operation in which the capacity of the machine 434 is increased in a motoring mode. As the boom B is lowering, there may be a positive recovery of energy available from the fluid expelled through the machine 434 and this is transferred into the gear train 480. Again, if the energy transfer is sufficient to increase the speed of rotation of the gear train, the accumulator 488 can be supplied through the operation of the machine 486 and conversely, during a lifting cycle, fluid stored in the accumulator 488 may be applied through the machine 486 into the gear train 480 to assist in rotation of the machine 434 or machine 484.

Similar energy transfer is available from the rotation of the superstructure S where the inertia of the superstructure may be used to store energy in the accumulator for subsequent use. In its basic operation therefore, it will be noted that the hydraulic transmission 410 is operable to transfer energy from different consumers and to conserve energy through the use of the accumulator 488 as required. Although a rotary drive 480 has been shown for the turntable T, a drive unit similar to 502 can be used in the same manner.

The individual control of the wheels W also permits control through signal line 458 of individual wheels through monitoring the speed of rotation of the individual wheels 14. In the event that one of the wheels W engages a low friction surface such as ice or mud, during acceleration or braking, its speed will differ from that of the other wheels W. The speed differential is noted by the control 450 and the capacity of that machine reduced accordingly to reduce the torque applied at that particular wheel. Under extreme conditions, the capacity of the machine will be reduced to zero so that the particular wheel may be considered to be coasting with no torque applied. However, in that condition, the pressure within the conduit 500 is maintained to the balance of the wheels thereby maintaining the traction or braking effort on those wheels. Once the wheel has decelerated, the torque may be reapplied. This permits a traction control and ABS to be implemented.

The individual drive to the wheels may also be incorporated into the steering of the vehicle by adjusting the torque applied to wheels on the same axle. Rotation of the control 451e produces a signal that requires the rotation of one pair of wheels at a different rate to the other. Thus, the capacity, and therefore torque, may be increased to the outside wheels requiring a higher rotational velocity supplied by the corresponding decrease made to the inside wheels. The pressure applied to each of the wheels remains constant due to the pressure compensation of the machine 484 and accordingly, an acceleration of the outside wheel occurs causing steering action of the vehicle without energy induction via machine 484.

What is claimed is:

1. A hydraulic transmission comprising a first rotary hydraulic machine to be driven by a prime mover, at least one hydraulic drive unit, a hydraulic conduit connecting said first machine and said drive unit, a control operable to control delivery of fluid between said first rotary machine and said drive unit, an additional variable capacity machine mechanically connected to said first machine to supply fluid to an accumulator and a sensor to monitor rotational speed of said first machine, said control operable to vary the capacity of said additional machine and thereby maintain said rotational speed at a desired level.

2. The transmission according to claim 1 wherein said additional machine is reversible to move between a pumping mode in which energy is absorbed from said first machine and a motoring mode in which energy is delivered to said first machine.

3. The transmission according to claim 2 wherein the capacity of said additional machine in either mode is modulated to maintain said rotational speed at a desired level.

4. The transmission according to claim 3 wherein said capacity is increased in either mode when said speed departs from said desired level.

5. The transmission according to claim 3 wherein the capacity of said additional machine is minimized when said rotational speed is at said desired level.

6. The transmission according to claim 3 wherein said prime mover is an internal combustion engine and said control operates to reduce fuel supply to said engine upon an increase in said rotational speed prior to modulation of the capacity of said additional machine.

7. The transmission according to claim 6 wherein said first machine is a variable capacity machine and has a pressure compensating control to vary the capacity of said machine to maintain a predetermined pressure in said conduit.

8. A method of operating a hydraulic transmission having a first rotary hydraulic machine to be driven by a prime mover, at least one hydraulic drive unit, a hydraulic conduit connecting said first machine and said drive unit, a control operable to control delivery of fluid between said first rotary machine and said drive unit, an additional variable capacity machine mechanically connected to said first machine to supply fluid to an accumulator and a sensor to monitor rotational speed of said first machine, said method comprising the steps of monitoring said speed of rotation and varying the capacity of said additional machine to maintain said speed at said desired level.

9. The method according to claim 8 including the step of minimizing the capacity of said additional machine when said speed is at said desired level.

10. The method according to claim 9 wherein said additional machine is reversible and said method includes the steps of conditioning said additional machine to a pumping mode if said speed exceeds said desired level and conditioning said additional machine to a motoring mode if said speed is below said desired level.

11. The method according to claim 10 wherein said prime mover is an internal combustion engine and said method includes the step of reducing fuel supply to said engine upon said speed exceeding said desired level prior to conditioning said additional machine to a pumping mode.

12. The method according to claim 11 including the step of conditioning said additional machine to a motoring mode to provide energy from said accumulator prior to increasing the supply of fuel to said engine.

13. A hydraulic transmission for a vehicle having a pair of drive members to propel the vehicle, said transmission comprising a first variable capacity reversible hydraulic machine to be driven by a prime mover, a plurality of variable capacity reversible hydraulic drive units, each associated with a respective one of the drive members, a hydraulic conduit connecting said first machine and said drive units, a pressure compensating control operable on said first machine to vary the capacity thereof and maintain a predetermined pressure in said conduit and an external control operable upon said drive units and vary the capacity thereof to vary the torque generated by respective ones of said drive units and a sensor associated with each of said drive members to determine the rotational speed thereof, said external control being operable to vary the capacity of respective ones of said drive units and change between a driving condition in which said drive unit consumes fluid in said conduit and a braking condition in which it delivers fluid to said conduit, and said pressure compensating control being operable to cause said first machine to reverse the mode of operation to maintain said predetermined pressure in said conduit, said control monitoring the relative speeds of rotation of said drive members and adjusting the capacity of said drive units to maintain a predetermined relationship therebetween.

14. The transmission according to claim 13 wherein with said drive units in a drive condition, said control operates to reduce the capacity of one of said drive units when said sensor detects that rotation of said one drive unit exceeds that established by said predetermined relationship.

15. The transmission according to claim 13 wherein with said drive units in a braking condition, said control operates to reduce the capacity of one of said drive units when said sensor detects that rotation of said one drive unit is less than that established by said predetermined relationship.

16. The transmission according to claim 13 wherein said control may vary said predetermined relationship and thereby effect steering of said vehicle.

* * * * *